United States Patent [19]

Iwamoto

[11] Patent Number: 5,393,839
[45] Date of Patent: Feb. 28, 1995

[54] CURABLE COMPOSITION CONTAINING POLYEPOXIDE AND POLYCARBODIIMIDE

[75] Inventor: Norikazu Iwamoto, Kobe, Japan

[73] Assignee: Nippon Paint Co., Ltd., Osaka, Japan

[21] Appl. No.: 161,448

[22] Filed: Dec. 6, 1993

Related U.S. Application Data

[63] Continuation of Ser. No. 885,736, May 19, 1992, abandoned.

[30] Foreign Application Priority Data

May 20, 1991 [JP] Japan ................... 2-114483

[51] Int. Cl.$^6$ ............... C08G 59/68; C08G 18/22; C08L 79/04
[52] U.S. Cl. .................... 525/111; 525/123; 525/124; 525/127; 525/128; 525/327.3; 525/452; 525/453; 525/454; 525/504; 525/528; 528/45; 528/51; 528/52; 528/53; 528/55; 528/56; 528/73
[58] Field of Search ............ 528/45, 51, 52, 53, 528/55, 56, 73; 525/111, 123, 124, 127, 128, 327.3, 452, 453, 454, 504, 528

[56] References Cited

U.S. PATENT DOCUMENTS

| | | | |
|---|---|---|---|
| 3,702,839 | 11/1972 | Glasgow et al. | 528/73 |
| 3,793,236 | 2/1974 | Ashida et al. | 528/55 |
| 4,022,721 | 5/1977 | Ashida | 528/73 |
| 4,055,522 | 10/1977 | Ashida et al. | 528/73 |
| 5,086,152 | 2/1992 | Iwamoto | 528/58 |
| 5,126,423 | 6/1992 | Iwamoto | 525/528 |

FOREIGN PATENT DOCUMENTS

| | | |
|---|---|---|
| 0342064 | 11/1989 | European Pat. Off. . |
| 0412759 | 2/1991 | European Pat. Off. . |
| 0444956 | 9/1991 | European Pat. Off. . |
| 2542489 | 4/1976 | Germany . |
| 4007141 | 4/1991 | Germany . |

*Primary Examiner*—Frederick Krass
*Attorney, Agent, or Firm*—Foley & Lardner

[57] ABSTRACT

The present invention provides a curable composition which employs the oxazolidineimine ring-forming reaction between an epoxide and a carbodiimide for curing and which cures under a mild condition in a short period of time with little side reaction to obtain a polycarbodiimide resin having good strength, heat resistance and processability. The curable composition of the present invention comprises (a) a polycarbodiimide, (b) a polyepoxide and (c) a zinc halide or a mixture of zinc halide and an onium salt as a catalyst.

1 Claim, No Drawings

CURABLE COMPOSITION CONTAINING POLYEPOXIDE AND POLYCARBODIIMIDE

This application is a continuation of U.S. application Ser. No. 07/885,736, filed May 19, 1992, now abandoned.

FIELD OF THE INVENTION

The present invention relates to a curable composition in which a polycarbodiimide is reacted with a polyepoxide in the presence of a specific catalyst to crosslink based on the formation of polyoxazolidine-imine rings.

Background of the Invention

Polyurethane resin or polyurea resin is generally prepared from a curable composition in which a polyisocyanate compound is used as a curing agent. The polyisocyanate compound, however, has short pot life because of high reactivity and is itself toxic. In order to improve the problems, a blocked polyisocyanate in which the isocyanate groups are blocked with a blocking agent is proposed. The blocking agent, however, is reproduced by unblocking upon curing and volatilized into the air. Also, the obtained resin has poor heat resistance.

In order to enhance heat resistance, it is proposed that the blocked polyisocyanate compound is heated in the presence of a catalyst to condense with removing carbondioxide, thus forming a polycarbodilmide resin. Since the carbodiimide structure has excellent heat resistance, the polycarbodiimide resin has been now intensely studied. However, the production of the polycarbodiimide resin is difficult because a relative high temperature is required and it takes a relatively long period of time to accomplish the reaction. Also the obtained resin itself has poor processability on molding and the like.

In order to improve the processability, it is proposed in J. Appl. Polym. Sci., by L. N. Alberine, Vol.21, p.1999 (1977) that molecular weight of the polycarbodiimide is controlled to provide flowability when heated. Japanese Kokai Publication 61-268714 also proposes that a polycarbodiimide having a low polymerization degree is heat-molded in the presence of a trimerizing agent. Even these improvements, however, require a high temperature treatment to achieve sufficient curing properties and the processability is still insufficient for practical use.

In relation to the reaction of a carbodiimide and an epoxide, Japanese Kokai Publication 62-1714 discloses that a polycarbodiimide having a low polymerization degree and an epoxide are heat-molded in the presence of a catalyst of a tertiary amine. It is also proposed in Chem. Ber., by K. Gulbins, Vol.94, p.3287 (1961) that a carbodiimide is reacted with an epoxide at 200° C. for 7 hours in the presence of a catalyst of lithium chloride or a tertiary amine to form a compound having a imidazolidone ring. In this method, the imidazolidone compound is formed by thermal-rearrangement reaction of an intermediate compound (i.e. oxazolidineimine). Pankratovv V. V. et al. report that the reaction of a carbodiimide and an epoxide not only forms an oxazolidineimine or an oxazolidone ring, but also conducts side-reactions of dimerizing and trimerizing the carbodiimide (see Acta. Polym., Vol.36(10), pp.550–555 (1985), CA:104(20)168970f). Further, Matsuda and Baba report that a carbodiimide is reacted with an epoxide under mild conditions in the presence of a catalyst of an organic tin halide to obtain a compound having an oxazolidineimine (see J. Org. Chem., Vol. 51, p 1277 (1986)). These reports, however, neither suggest nor teach that the oxazolidineimine ring-forming reaction between an epoxide and a carbodiimide can apply to a curing reaction of resins.

SUMMARY OF THE INVENTION

The present invention provides a curable composition which employs the oxazolidineimine ring-forming reaction between an epoxide and a carbodiimide for curing and which cures under a mild condition in a short period of time with little side reaction to obtain a polycarbodiimide resin having good strength, heat resistance and processability. The curable composition of the present invention comprises (a) a polycarbodiimide, (b) a polyepoxide and (c) a zinc halide or a mixture of zinc halide and an onium salt as a catalyst.

DETAILED DESCRIPTION OF THE INVENTION

The polycarbodiimide employed in the present invention is a compound which has at least 2 carbodiimide groups, preferably at least 3 carbodiimide groups in one molecule. The term "poly" of the "polycarbodiimide" means number of the carbodiimide groups and does not mean height of molecular weight. The molecular weight of the polycarbodiimide is not limited, but preferably is within the range of 250 to 10,000. All reference to molecular weights herein is to number average molecular weights. The polycarbodiimide is known to the art, and preferably prepared by polycondensation of an organic polyisocyanate in the presence of a carbodiimide promoting agent. The organic polyisocyanate is known to the art in the polyurethane industry, including an aromatic polyisocyanate, such as 2,4- or 2,6-tolylene diisocyanate, naphthalene 1,5-diisocyanate and diphenylmethane 4,4'-diisocyanate; and an aliphatic or alicyclic polyisocyanate, such as hexamethylene diisocyanate, hydrogenated diphenylmethane 4,4'-diisocyanate, isophorone diisocyanate, hydrogenated 2,4- or 2,6-tolylene diisocyanate. Another modified polyisocyanate may also be used, for example an isocyanate group containing prepolymer which is prepared by reacting a polyisocyanate with an active hydrogen containing material (e.g. Isonate 181 available from Dow Chemical Co. and Mondur PF available from Mobey Chemical Co.), a polyisocyanate having a carbodiimide group or a urethoimine group (e.g. Isonate 1431 available from Dow Chemical Co., Mondur CD available from Mobey Chemical Co. and Millionate MTL available from Nippon Polyurethane Co. Ltd.), a polyisocyanate having an allophanate bond (e.g. Mondur HR available from Mobey Chemical Co.), a polyisocyanate having a bluret bond (e.g. Desmodur N available from Mobey Chemical Co.), a polyisocyanate having an isocyanurate ring (e.g. Desmodur Z 4370 and Desmodur CTS Tabil both available from Mobey Chemical Co.) and the like.

The carbodiimide promoting agent can be anyone known to the art and typically is described in Chemical Review, by Andrew Williams, Ibrahim T. Ibrahim, Vo.. 81, No. 4, p. 619 (1981). Among them, 1-phenyl-phosphorene-1-oxide, 1-phenyl-3-methyl-phosphorene-1-oxide and 1-ethyl-phosphorene-1-oxide are preferred.

In the preparation of the polycarbodiimide, molecular weight can be controlled by terminating the polycondensation with an organic monoisocyanate (see J. Appl. Polym. Sci. by L. N. Alberine, Vol 21, p. 1999

(1977)). Examples of the organic monoisocyanates are phenyl isocyanate, tolyl isocyanate, cyclohexyl isocyante, butyl isocyanate and the like. A blocking technique in which a terminal isocyanate group is blocked with an active-hydrogen containing compound (a blocking agent) can also control the molecular weight of the polycarbodiimide. The blocking agent is described in detail in for example Progress in Organic Coatings, Vol. 3, p. 73 (1975). Typical examples of the blocking agents are alcohols, phenols, lactams, N-hydroxyimide, oximes, imidazoles, triazoles, active methylene compounds (e.g. acetyl acetone and diethyl malonate), aromatic secondary amines, acidic sodium sulfite and the like.

The polyepoxide used in the present invention is a compound having at least two epoxy groups. It should be noted that the term "poly" in the "polyepoxide" does not mean molecular weight but number of epoxy groups. A molecular weight of the polyepoxide is not limited, but typically within the range of 200 to 50,000. The polyepoxide is widely known to the art and a typical example is a glycidyl ether of bisphenols, such as a glycidyl ether of bisphenol A and a glycidyl ether of bisphenol F, such as DER-332 and DER-542 available from Dow Chemical Co., YD-128 and YDF-170 available from Toto Kasei Company, Epicoat 828 available from Shell Chemical Industries Inc., Epichlone 850 and Epichlone available from Dai Nippon Chemical Industries Inc. and the like. The polyepoxide can be polynuclear phenol glycidyl ether derivatives or epoxide phenyl novolac resins, for example DEN-431 and DEN-438 both available from Dow Chemical Co., EPN-1139 and ECN-1235 both available from Ciba Geigy Co. and the like. Another polyepoxide, such as an aromatic glycidyl amine resin obtained from an aromatic amine and epichlorohydrin, can be used. Examples of the polyepoxides are triglycidyl-p-aminophenol, N,N,N',N'-tetraglycidyl-4,4'-diminodiphenylmethane and the like. The polyepoxide also includes a glycidyl ester of an aromatic, aliphatic or alicyclic polycarboxylic acid or a glycidyl ether of a reaction product of the aromatic, aliphatic or alicyclic polycarboxylic acid and a polyol. Examples of such polyepoxides are CY-192 and CY-184 both available from Ciba Geigy AG, EPO-MIK-508 and EPOMIK-540 both available from Mitsui Petrochemical Industries Ltd. and the like. Another suitable polyepoxide can be an aliphatic epoxy resin, such as a glycidyl ether of alkylene glycol or polyether polyol. Typical examples of such polyepoxides are DER-736 and DER-732 both available from Dow Chemical Co., EPOMIK R-810 available from Mitsui Petrochemical Industries Ltd. and the like. Further, an epoxidized compound of cyclo-olefin can be used as the polyepoxide. Examples of the epoxidized compounds are 3,4-epoxycyclohexylmethyl-3',4'-epoxycyclohexane carboxylate and the like. In addition, an acrylic resin having a glycidyl group or a 3,4-epoxycyclohexylmethyl group derived from glycidyl acrylate, glycidyl methacrylate, 3,4-epoxycyclohexylmethyl acrylate, 3,4-epoxycyclohexylmethyl methacrylate etc. can also be suitable for the polyepoxide. The above polyepoxide can be solely used or in combination.

The catalyst employed in the present invention is a compound which promotes the formation of the oxazolidineimine ring obtained from the reaction of the polycarbodiimide and the polyepoxide. In the present invention, the catalyst is zinc halide or a mixture of zinc halide and an onium salt. The halogen atom may include bromine, iodine and chlorine, and the zinc halide can therefore be zinc chloride, zinc bromide, zinc iodide or mixtures thereof.

The onium salt may be an ammonium salt, a phosphonium salt or a stibonium salt which is represented as follow;

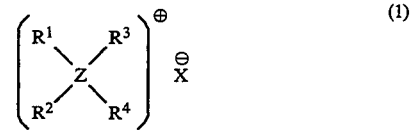

[wherein Z represents a nitrogen atom, a phosphorus atom or a stibium atom, $R^1$ to $R^4$, which are same or different, represent an organic group and may form a ring groups in combination, and X represents a halogen atom.] The organic group in the formula (1) includes an aliphatic hydrocarbon group, an alicyclic hydrocarbon group and an aromatic hydrocarbon group. The aliphatic hydrocarbon group preferably has 1 to 16 carbon atoms, for example methyl, ethyl, octyl and the like. The alicyclic hydrocarbon preferably has 5 to 12 carbon atoms, for example cyclopentane, cyclohexane and the like. The aromatic hydrocarbon group preferably has 6 to 16 carbon atoms, for example phenyl, tolyl, xylyl and the like.

Typical examples of the ammonium salts are tetramethylammonium iodide, tetramethylammonium bromide, tetraethylammonium iodide, tetraethylammonium bromide, tetrapropylammonium iodide, tetrapropylammonium bromide, tetrabutylammonium iodide, tetrabutylammonium bromide, tetraisoamylammonium iodide, tetraisoamylammonium bromide, tetrapentylammonium iodide, tetrapentylammonium bromide, methyltriethylammonium iodide, methyltriethylammonium bromide, trimethylphenylammonium iodide, trimethylphenylammonium bromide, trimethylbenzylammonium iodide, trimethylbenzylammonium bromide and the like.

Typical examples of the phosphonium salts are tetrabutylphosphonium iodide, tetrabutylphosphonium bromide, tetraphenylphosphonium iodide, tetraphenylphosphonium bromide, butyltriphenylphosphonium iodide, butyltriphenylphosphonium bromide, methyltriphenylphosphonium iodide, methyltriphenylphosphonium bromide, tributylphenylphosphonium iodide, tributylphenylphosphonium bromide and the like.

Typical examples of the stibonium salts are tetraphenylstibonium iodide, tetraphenylstibonium bromide, tetrabenzylstibonium iodide, tetrabenzylstibonium bromide, tetrabutylstibonium iodide, tetrabutylstibonium bromide and the like.

Where the catalyst is the mixture of zinc halide and an oumin salt, it is considered that a complex formed from the onium salt and zinc halide actually acts as the catalyst. Accordingly, the complex may be separately prepared from the curable composition and then formulated into the curable composition. The complex can be prepared by reacting zinc halide and the onium salt at a temperature of room temperature to 150° C. in a molar ratio of about 1:1 in the presence or absence of an inactive organic solvent. Suitable inactive organic solvents are ketones, esters, ethers, aromatic hydrocarbons, chlorinated hydrocarbons and the like.

The curable composition of the present invention may further contain additives, such as filler, reinforcing agent, antioxidant, fire-retardant, pigment, surfactant, catalyst, surface controlling agent and the like.

The polyepoxide may be present in the curable composition in an amount of 0.01 to 1.0 equivalent, preferably 0.1 to 1.0 equivalent, as epoxy group based on one equivalent of the carbodiimide group. The catalyst (c) may be contained in the curable composition in an amount of 0.01 to 10 parts by weight, preferably 0.1 to 5 parts by weight, based on 100 parts by weight of total weight of the polycarbodiimide (a) and the polyepoxide (b).

The curable composition easily cures at an elevated temperature of 60° to 200° C., preferably 80° to 160° C. for 0.5 to 1.0 hours. The composition therefore can be used for molding, coating, adhesives, sealant and the like. Coating can be conducted by coating the curable composition on a substrate and then curing at the elevated temperature. Examples of the substrates are metal, steel, glass, plastics and the like. Coating can be conducted by spraying, brushing, dipping, flow coating and the like. It is preferred that the composition is coated in a dried coating amount of 5 to 250 g/m².

EXAMPLES

The present invention is illustrated by the following Examples which, however, are not to be construed as limiting the present invention to their details.

Preparation of polycarbodiimide

Polycarbodiimide resin (A)

A reaction vessel was charged with 91 g of toluene, to which 25 g of methylenediphenyl diisocyanate, 24 g of phenyl isocyanate and 0.75 g of 3-methyl-1-phenyl-2-phosphorene-1-oxide as the carbodiimide promoting agent were added. It was reacted at about 100° C. for 4 hours to obtain a polycarbodiimide resin having a terminal phenyl group (non-volatile content=35%, number average molecular weight (GPC)=about 400).

Polycarbodiimide resin (B)

A reaction vessel was charged with 220 g of o-dichlorobenzene, to which 75 g of methylenediphenyl diisocyanate, 18.8 g of phenyl (blocking agent) and 0.75 g of 3-methyl-1-phenyl-2-phosphorene-1-oxide as the carbodiimide promoting agent were added. It was reacted at about 110° C. for 8 hours to obtain a polycarbodiimide resin having a terminal blocked isocyanate group (non-volatile content=30%, number average molecular weight (GPC)=about 1,000).

Polycarbodiimide resin (C)

A reaction vessel was charged with 97 g of o-dichlorobenzene, to which 44.4 g of isophorone diisocyanate, 20 g of n-butyl isocyanate and 1.3 g of 3-methyl-1-phenyl-2-phosphorene-1-oxide as the carbodiimide promoting agent were added. It was reacted at about 190° C. for 4 hours to obtain a polycarbodiimide resin having a terminal n-butyl group (non-volatile content=40%, number average molecular weight (GPC)=about 600).

Polycarbodiimide resin (D)

A reaction vessel was charged with 116 g of o-dichlorobenzene, to which 52.4 g of methylenedicyclohexane diisocyanate, 25 g of cyclohexane isocyanate, and 1.5 g of 3-methyl-1-phenyl-2-phosphorene-1-oxide as the carbodiimide promoting agent were added. It was reacted at about 190° C. for 20 hours to obtain a polycarbodiimide resin having a terminal cyclohexane group (non-volatile content=40%, number average molecular weight (GPC)=about 650).

Polycarbodiimide resin (E)

A reaction vessel was charged with 120 g of o-dichlorobenzene, to which 78.9 g of methylenedicyclohexane diisocyanate and 1.5 g of 3-methyl-1-phenyl-2-phosphorene-1-oxide as the carbodiimide promoting agent were added. It was reacted at about 190° C. for 8 hours, and cooled to 110° C. at which 17.3 g of 4-methyl-2-pentaneoxime (blocking agent) was dropwise added and reacted 4 hours. A polycarbodiimide resin having a terminal phenyl group (non-volatile content=35%, number average molecular weight (GPC)=about 400) was obtained.

Preparation of polyepoxide

Acryl resin (F) having epoxy groups

A reaction vessel was charged with 66.7 g of xylene, to which 50 g of glycidyl methacrylate, 38 g of methyl methacrylate, 12 g of 2-ethylhexyl acrylate and 10 g of Kaya Ester-O (t-butyl peroxy 2-ethylhexanoate available from Kayakunuri Co.) were added and reacted at 130° C. for 3 hours to obtain an acryl resin having epoxy groups (non-volatile content=58.8, number average molecular weight=about 2,500).

Acryl resin (G) having epoxy groups

A reaction vessel was charged with 66.7 g of xylene, to which 50 g of 3,4-epoxycyclohexylmethyl methacrylate, 38 g of methyl methacrylate, 12 g of 2-ethylhexyl acrylate and 10 g of Kaya Ester -O were added and reacted at 130° C. for 3 hours to obtain an acryl resin having epoxy groups (non-volatile content=58.2, number average molecular weight=about 2,500).

Curable composition and its evaluation

Example 1

A dispersion solution was prepared by mixing 57.1 g of the polycarbodiimide resin (A), 66.6 g of a bisphenol A glycidyl ether (DER-671-T75 having an expoxy equivalent of 500, available from Dow Chemical Co.) and 45 g of ZnBr2 which was dissolved in acetone.

The obtained solution was coated on a tin plate in a thickness of about 20 micron and hated at 100° C. for 30 minutes to obtain a colorless transparent smooth film having no surface stickiness. The film was evaluated by pencil hardness (according to JIS K 5400), scratch resistance (nail scratch test) and solvent resistance (xylene rubbing test), but the results were all good. The cured film was subjected to infrared spectrum to show that a carbodiimide bond (2150 cm$^{-1}$) disappeared and an oxazolidineimine ring bond appeared at 1675 cm$^{-1}$

Examples 2 to 10

The same experiment was conducted as generally described in Example 1, based on the conditions shown in Table 1. The film evaluations also indicate in Table 1. The cured film was subjected to infrared spectrum to show that a carbodiimide bond disappeared and an oxazolidineimine ring bond appeared.

TABLE 1

| Formulation | Examples | | | |
|---|---|---|---|---|
| | 2 | 3 | 4 | 5 |
| DER-671 | 66.6 | 66.6 | 66.6 | 66.6 |
| Carbodiimide resin | | | | |
| (A) | 57.1 | 57.1 | 57.1 | |
| (C) | | | | 50.0 |
| (C) | | | | |
| XL-29SE* | | | | |
| ZnBr2 | | | | |
| ZnI2 | 0.64 | | | |

TABLE 1-continued

| | | | | |
|---|---|---|---|---|
| ZnBr$_2$/Bu$_4$Ni | | 0.25/0.37 | | 0.25/0.37 |
| ZnBr$_2$/Bu$_4$NBr | | | | |
| ZnBr$_2$/Ph$_4$Pi | | | 0.25/0.46 | |
| ZnBr$_2$/Ph$_4$Sbi | | | | |
| Curing Conditions | | | | |
| Temp. (°C.) | 100 | 100 | 100 | 140 |
| Time (min) | 30 | 30 | 30 | 30 |
| Film qualities | | | | |
| Appearance by eyes | Good | Good | Good | Good |
| Hardness | H | 2H | H | B |
| Scratch resistance | Good | Good | Good | Good |
| Solvent resistance | Good | Good | Good | Good |

*XL-29SE Carbodiimide resin having a carbodiimide equivalent of 410 and a nonvolatile content of 50%, available from Union Carbide Corporation.

| | Examples | | | |
|---|---|---|---|---|
| Formulation | 6 | 7 | 8 | 9 |
| DER-671 | 66.6 | 66.6 | 66.6 | 66.6 |
| Carbodiimide resin | | | | |
| (A) | | | | |
| (C) | | | | |
| (D) | 54.1 | | | |
| XL-29SE | | 82.0 | 82.0 | 82.0 |
| ZnBr$_2$ | | 0.45 | | |
| Zni$_2$ | | | | |
| ZnBr$_2$/Bu$_4$Ni | 0.25/0.37 | | 0.25/0.37 | |
| ZnBr$_2$/Bu$_4$NBr | | | | 0.25/0.32 |
| ZnBr$_2$/Ph$_4$Pi | | | | |
| ZnBr$_2$/Ph$_4$Sbi | | | | |
| Curing Conditions | | | | |
| Temp. (°C.) | 140 | 160 | 140 | 140 |
| Time (min) | 30 | 30 | 30 | 30 |
| Film qualities | | | | |
| Appearance by eyes | Good | Good*1 | Good | Good |
| Hardness | HB | B | HB | HB |
| Scratch resistance | Good | Good | Good | Good |
| Solvent resistance | Good | Good | Good | Good |

*1 Slightly colored.

| | Examples |
|---|---|
| Formulation | 10 |
| DER-671 | 66.6 |
| Carbodiimide resin | |
| (A) | |
| (C) | |
| (D) | |
| XL-29SE | 80.0 |
| ZnBr$_2$ | |
| Zni$_2$ | |
| ZnBr$_2$/Bu$_4$Ni | |
| ZnBr$_2$/Bu$_4$NBr | |
| ZnBr$_2$/Ph$_4$Pi | |
| ZnBr$_2$/Ph$_4$Sbi | 0.25/0.56 |
| Curing Conditions | |
| Temp. (°C.) | 140 |
| Time (min) | 30 |
| Film qualities | |
| Appearance by eyes | Good |
| Hardness | F |
| Scratch resistance | Good |
| Solvent resistance | Good |

EXAMPLES 11 to 14

The same experiment was conducted as generally described in Example 1, based on the conditions shown in Table 1. The film evaluations also indicate in Table 1. The cured film was subjected to infrared spectrum to show that a carbodiimide bond disappeared and an oxazolidineimine ring bond appeared.

TABLE 2

| | Examples | | | |
|---|---|---|---|---|
| Formulation | 11 | 12 | 13 | 14 |
| DEN-431 | 17.5 | | | 54.5 |
| Epoxy resin | | | | |

TABLE 2-continued

| | Examples | | | |
|---|---|---|---|---|
| Formulation | 11 | 12 | 13 | 14 |
| (F) | | 54.5 | | |
| (G) | | | 91.8 | |
| Carbodiimide resin | | | | |
| (B) | | 166.0 | | |
| (E) | | | 100.0 | |
| XL-29SE | | | | 82.0 |
| XL-27HS* | 30.0 | | | |
| ZnBr$_2$/Bu$_4$Ni | 0.25/0.37 | 0.25/0.37 | | 0.25/0.37 |
| ZnBr$_2$/Ph$_4$Sbi | | | 0.25/0.55 | |
| Curing Conditions | | | | |
| Temp. (°C.) | 140 | 120 | 104 | 140 |
| Time (min) | 30 | 30 | 30 | 30 |
| Film qualities | | | | |
| Appearance by eyes | Good*1 | Good | Good*2 | Good |
| Hardness | HB | HB | HB | HB |
| Scratch resistance | Good | Good | Good | Good |
| Solvent resistance | Good | Good | Good | Good |

*XL-27HS Carbodiimide resin having a carbodiimide equivalent of 220 and a nonvolatile content of 73%, available from Union Carbide Corporation.
*1 or *2 Slightly colored

Comparative Examples 1–4

The same experiment was conducted as generally described in Example 1, based on the conditions shown in Table 3. The film evaluations also appear in Table 3, but sufficient results have not been obtained. The cured film was subjected to infrared spectrum analysis to show that a carbodiimide bond did not disappear and an oxazolidineimine ring bond did not appear.

TABLE 3

| | Comparative Examples | | | |
|---|---|---|---|---|
| Formulation | 1 | 2 | 3 | 4 |
| DER-671 | 66.6 | 66.6 | 66.6 | 66.6 |
| XL-29SE | 82.0 | 82.0 | 82.0 | 82.0 |
| Bu$_4$Ni | | 0.74 | | |
| Ph$_4$Sbi | | | 1.10 | |
| 2-Ethyl,4-methyl imidazole | | | | 0.65 |
| Curing Conditions | | | | |
| Temp. (°C.) | 160 | 160 | 160 | 160 |
| Time (min) | 30 | 30 | 30 | 30 |
| Film qualities | | | | |
| Appearance by eyes | *1 | *2 | *2 | Colored |
| Scratch resistance | Poor | Poor | Poor | Poor |
| Solvent resistance | Poor | Poor | Poor | Poor |

*1 Slightly sticky
*2 Slightly shrinkage

The present invention provides a curable composition which is quickly cured at more mild conditions and which curing reaction can be controlled without side reaction. The composition provides a polycarbodiimide resin having excellent strength, heat resistance and processability.

What is claimed is:

1. A curable composition comprising:
   (a) a polycarbodiimide having at least 2 carbodiimide groups and a number average molecular weight of 250 to 10,000, prepared by polycondensation of an organic polyisocyanate in the presence of a carbodiimide promoting agent;
   (b) a polyepoxide having at least 2 epoxy groups and a number average molecular weight of 200 to 50,000; and
   (c) as a catalyst, a zinc halide or a mixture of a zinc halide and an onium salt represented by

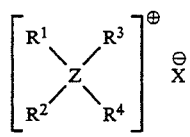

wherein Z represents a nitrogen atom or a phosphorous atom, $R^1$ to $R^4$, which are the same or different, each represent an organic group selected from the group consisting of aliphatic hydrocarbon groups, alicyclic hydrocarbon groups and aromatic hydrocarbon groups, and may form a ring in combination, and X represents a halogen atom characterized in that, when cured, said carbodiimide groups react with said epoxy groups to form oxazolidineimine groups.

* * * * *